United States Patent [19] [11] 4,254,658

Kogler et al. [45] Mar. 10, 1981

[54] APPARATUS FOR BALANCING OF ROTORS

[75] Inventors: Horst Kogler, Dieburg; Eickhart Goebel, Pfungstadt, both of Fed. Rep. of Germany

[73] Assignee: Gebr. Hofmann G.m.b.H. & Co., Maschinenfabrik, Darmstadt, Fed. Rep. of Germany

[21] Appl. No.: 49,786

[22] Filed: Jun. 18, 1979

Related U.S. Application Data

[63] Continuation of Ser. No. 872,111, Dec. 22, 1977, abandoned.

[30] Foreign Application Priority Data

Jan. 18, 1977 [DE] Fed. Rep. of Germany ....... 2701876

[51] Int. Cl.³ ............................................. G01M 1/22

[52] U.S. Cl. ........................................ 73/462; 73/487

[58] Field of Search ................. 73/460, 462, 487, 457, 73/459; 74/16

[56] References Cited

U.S. PATENT DOCUMENTS

| | | | |
|---|---|---|---|
| 3,357,259 | 12/1967 | Hansen | 73/484 |
| 3,581,576 | 6/1971 | Reiser | 73/459 |
| 3,922,922 | 12/1975 | Goebel | 73/462 |

*Primary Examiner*—James J. Gill
*Attorney, Agent, or Firm*—Cushman, Darby & Cushman

[57] ABSTRACT

Apparatus for balancing a rotor such as an automobile tire, having a locally fixed axle rigidly coupled with respect to a driving motor and a hub rotatably mounted about the fixed axle. The rotatable hub is driven by the motor and the rotor to be balanced is clamped to the hub by a flanged on clamp or a plate having one or more pins for engaging wheel spokes. Data receivers engage the locally fixed axle for producing signals which indicate rotor unbalance.

9 Claims, 5 Drawing Figures

Fig. 3
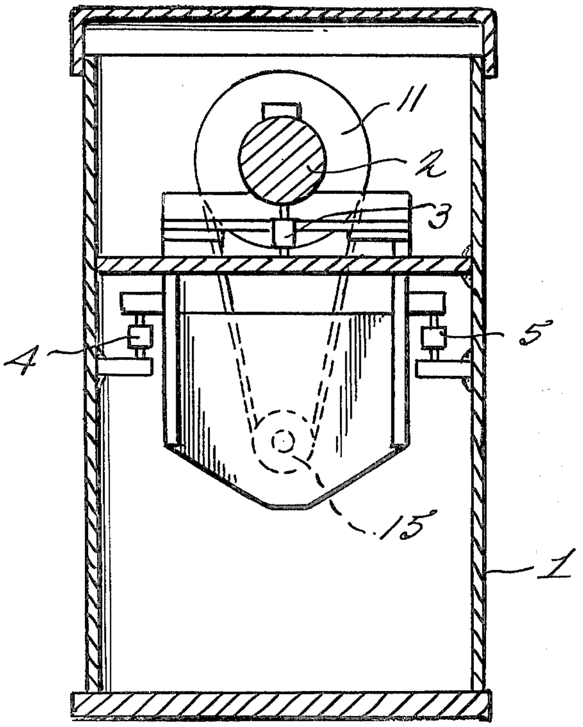
Fig. 4
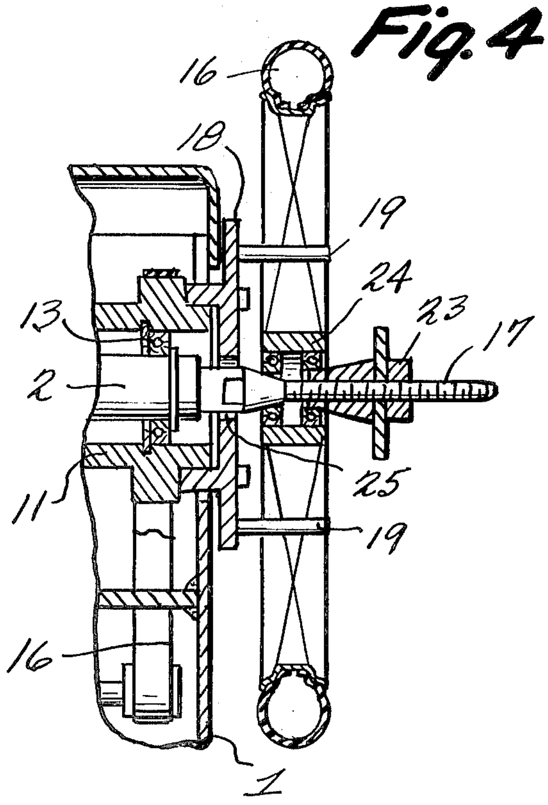
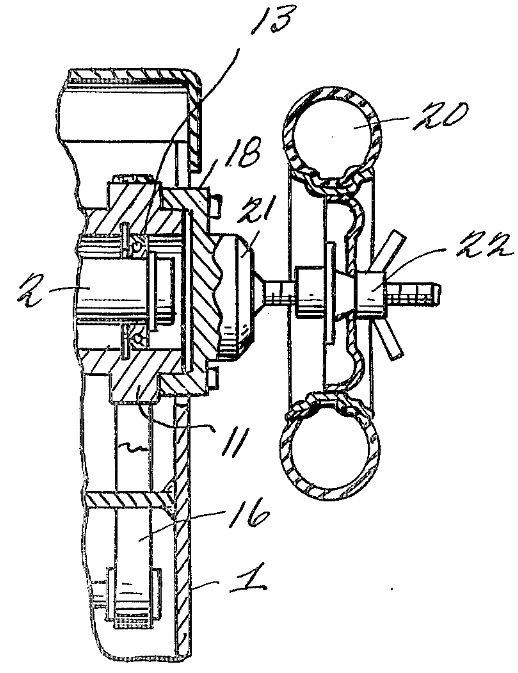
Fig. 5

APPARATUS FOR BALANCING OF ROTORS

This is a continuation of application Ser. No. 872,111 filed Dec. 22, 1977, now abandoned.

The invention relates to an apparatus for balancing of rotors such as car wheels which are brought into operating connection with a driving motor on a receiving arrangement provided in or on a housing or frame. Various clamping devices for different types of rotors are provided for carrying out test runs.

An apparatus for highly accurate balancing of unbalanced bodies, especially of car wheels is described in U.S. Pat. No. 3,922,922. The rotor that is to be balanced is fixed on a clamping shaft driven by a motor. The clamping shaft, together with the motor, is pivotably mounted for movement between a horizontal and a vertical position. Moreover, data receivers (transducers) are disposed such that they lie outside of the influence of forces and thrusts emanating from the belt drive or motor. In this way, a highly accurate test run may be carried out with this known balancing apparatus, both in the horizontal and the vertical positions of the clamping shaft.

For rotors having a relatively high weight, the test run is carried out in the vertical position of the clamping shaft (horizontal rotor position) because in the horizontal shaft position (vertical rotor position), flexure under the load of the clamping shaft produces errors . Thus, relatively heavy rotors may also be balanced. However, when such relatively heavy rotors are tested in the vertical position, the shaft must thereafter be pivoted into the horizontal position for adding balancing weights.

Therefore the primary object of the present invention is to provide an apparatus for balancing, rotors especially for the highly accurate balancing of unbalanced rotors wherein a test balancing run may also be carried out for heavy unbalanced rotors in a horizontal position of the clamping device in relation to the clamping shaft (vertical position of the rotor that is to be balanced), so that a swivelling of the rotor for the subsequent attachment of the eccentric weights is unnecessary.

This object is achieved by providing an apparatus of the initially mentioned type wherein the driving motor is rigidly connected with a locally fixed axle, which is supported vis-a-vis the housing or the frame via the data receivers (transducers), and which is in operating connection with a rotatable hub, mounted on the axle, which may be coupled with the rotor that is to be balanced. A rotor may be mounted rotatably on a clamping arrangemebt, or a clamping arrangement may be attached to the hub of the clamping arrangement on which a rotor may be clamped down with torsional strength.

Flexures under load, which may result upon clamping down of rotors which are relatively heavy as compared to the clamping arrangemeht, do not have a disadvantageous effect during the test balancing run, since this clamping arrangement is disposed, locally fixed on the likewise locally fixed axle. Therefore, the test run may be carried out with a vertical arrangement of the rotor. A swivelling of the rotor into the horizontal position during the test run is not necessary. In case of the balancing of, for example, motorcycle wheels, the wheel with its wheel bearing may be placed on the clamping arrangement which may be connected rigidly with the axle. The rotary connection between the hub and the wheel may be accomplished, for example, with the help of one or more pegs, which, is case it is a matter of a spoked wheel, engage between the spokes. These driving pegs may also be seated on a driving disc, which may be attached to the hub. The driving disc may be developed such that it projects through a central opening of the clamping arrangement on which the wheel is seated and which is connected with the locally fixed axle.

The axle may be supported by way of two springs in the horizontal plane and by way of three data receivers (tranducers) in all other degrees of freedom vis-a-vis the housing or the frame. As the result of the three data receivers, a stable arrangement of the axle is obtained. There is no danger of any data errors ocurring as a result of flexures under load, since the hub and the axle together are developed to be sufficiently bending resistant.

Moreover, in the case of the stationary clamping apparatus which is connected with the axle, possible deflections or centering errors during the test run have no disadvantageous effect since they have no influence on the result of the measurement. This clamping arrangement may be developed as a stationary clamping mandrel which is relatively thin so that even thin wheel hubs or wheel bearings may be pushed onto this clamping shaft.

Embodiments of the invention are shown in the attached drawings. The invention will be explained in more detail on the basis of these drawings in which:

FIG. 3 is a sideview of the balancing apparatus in FIGS. 1 and 2, in section;

FIG. 4 is a first clamping arrangement, which is flanged to the axle; and

FIG. 5 is a second clamping arrangement, which is flanged to the hub.

Figure 1:
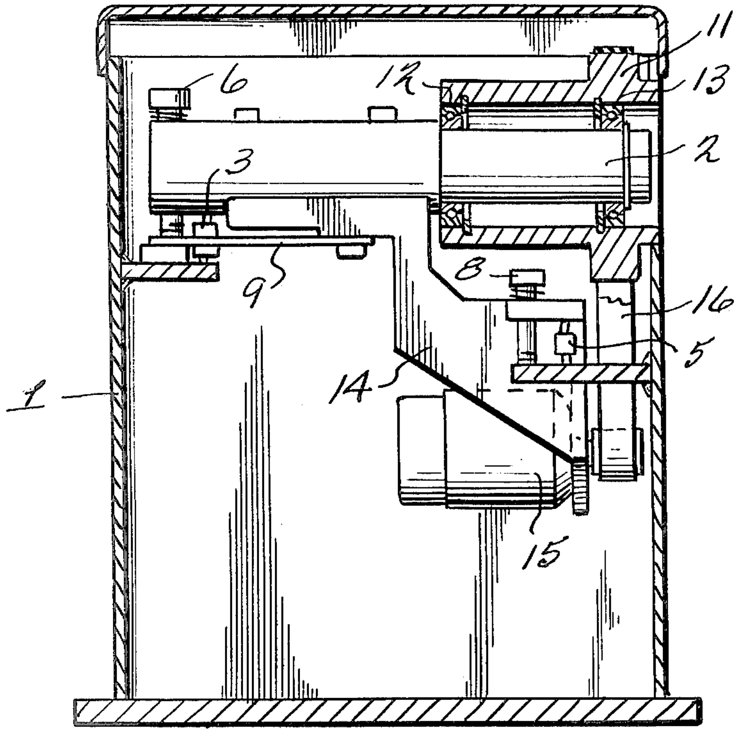
FIG. 1 shows a sectional view of a balancing apparatus according to an embodiment of the present invention.
Figure 2:
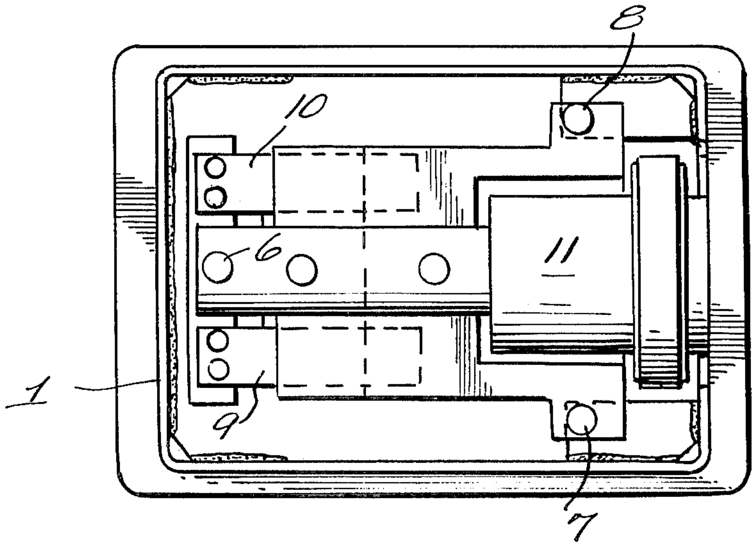
FIG. 2 is a top view of the balancing apparatus in FIG. 1 with the housing lid removed.

Referring to FIGS. 1-3, a rigid axle 2 is fixedly supported in a housing, locally fixed by way of three data receivers (also referred to as transducers) 3, 4 and 5 in the vertical plane. Such data receivers are preferably conventional transducers. The use of such conventional data receivers for measuring rotor unbalance in prior art balance apparatus is well known. Examples of their use in prior art devices are shown in U.S. Pat. Nos. 3,785,210 and 3,788,147. In addition, U.S. Application Ser. No. 909,060 and U.S. Pat. No. 3,922,922 describe balancing apparatus wherein a clamping shaft is mounted in two planes by means of data receivers. The data receivers 3, 4 and 5 are prestressed by way of flexible screws 6, 7 and 8. The axle 2 is fixed in the horizontal plane by leaf-springs 9 and 10. A hub 11 is mounted rotatably on the axle 2 by ball bearings 12 and 13. This hub is also fixed in a known manner in the axial direction. A driving motor 15 is attached, for example screwed on, to an angle plate 14 which is connected rigidly with axle 2. The hub 11 is driven via belt drive 16 by the driving motor 15. Since the motor 15 is connected rigidly with the axle 2, the data receivers 3, 4 and 5 lie outside the flux of force of the forces and thrusts emanating from the belt drive and motor.

FIG. 4 shows a clamping arrangement 17, which may be used for balancing of rotors, for example, wheels of motorcycles or other spoked wheels 16, which are relatively heavy vis-a-vis the flexural rigidity of the clamping arrangement. This clamping arrangement 17 is developed in the manner of a shaft, which, however, is at a standstill during the test run. The clamping arrangement 17 is rigidly connected with the axle 2, for example, by being flanged on. The wheel hub 24 is pushed onto the clamping device 17 and may be attached and centered with the aid of a centering device 23. During the test run, the wheel 16 rotates in its own bearing. The rotational movement of the hub 11 is transferred to the wheel 16 that is to be balanced by driving pins 19, which are mounted on a drive disc 18. The drive disc 18 is connected firmly and rotatably with hub 11, for example, by flanging on or screwing on. The clamping device including a shaft 17 projects through a central bore in the drive disc 18.

FIG. 5 shows a clamping arrangement 21, which is connected firmly, rotatably, with the hub 11 by flanging on and screwing down. The wheel 20, which may be a car wheel and which is to be balanced is clamped with a torsional strength on this clamping arrangement 21 with the aid of a conventional clamping means 22. The rotational movement of hub 11 is transferred to the wheel 20 via the clamping arrangement 21 and the clamping means 22. The clamping shaft, shown in FIG. 5, has a high flexural strength (bending resistance).

Depending on the type of rotor that is to be balanced, the clamping apparatus shown either in FIG. 4 or FIG. 5 will be used in the balancing apparatus. In this way, there results the balancing apparatus which can be used for a large number of different types of rotors that are to be balanced.

Many changes and modifications in the embodiments described above can, of course, be made without departing from the scope of the present invention. That scope, therefore, is understood to be limited only by the scope of the appended claims.

What is claimed is:

1. An apparatus for balancing rotors comprising:
a frame;
a locally fixed axle;
a driving motor;
means for supporting said axle on said frame and for rigidly connecting said axle and motor;
a hub rotatably mounted about said fixed axle;
means for connecting said hub and motor for rotating said hub;
means for clamping a rotor to be balanced on said apparatus so that said rotor is rotated by said hub wherein said clamping means includes at least one drive pin for engaging spokes of a rotor to be balanced; and
a plurality of data receivers for engaging said axle to produce signals indicating the unbalance of said clamped rotor.

2. An apparatus for balancing rotors comprising:
a frame;
a locally fixed axle;
a driving motor;
means for supporting said axle on said frame and for rigidly connecting said axle and motor;
a hub rotatably mounted about said fixed axle;
means for connecting said hub and motor for rotating said hub;
means for clamping a rotor to be balanced on said apparatus so that said rotor is rotated by said hub wherein said clamping means includes a drive disc disposed on said hub said drive disc having a central opening and said clamping means including a shaft extending through said opening for receiving said rotor to be balanced; and
a plurality of data receivers for engaging said axle to produce signals indiating the unbalance of said clamped rotor.

3. A rotor balancing apparatus comprising:
a frame;
a motor having a drive shaft;
at least one data receiver for generating a rotor unbalance signals;
a locally fixed axle supported in the vertical plane by said data receiver and supported in the horizontal plane by at least one spring;
means for supporting said axle on said frame for rigidly coupling said fixed axle with said motor;
a hub rotatably mounted about said fixed axle;
means for coupling said hub with the drive shaft of said motor for rotating said hub about said loclly fixed axle; and
means for clamping a rotor to be balanced to said hub such that it rotates with said hub, wherein said means for clamping includes at least one drive pin for engaging spokes of a rotor to be balanced.

4. An apparatus according to claim 3, wherein said means for clamping includes a drive disc disposed on said hub.

5. An apparatus according to claim 4, wherein said drive disc has a central opening and wherein said means for clamping includes a shaft extending through said opening for receiving a rotor to be balanced.

6. An apparatus for balancing a rotor comprising:
a frame;
a data receiver, rigidly coupled to said frame;
an axle supported by said data receiver so as to be locally fixed in the vertical plane;
a driving motor having a stator rigidly coupled with said axle and with said data receiver;
a hub rotatably mounted about said fixed axle;
means for connecting said hub and motor for rotating said hub; and
a releasable clamping arrangement for clamping said rotor to be balanced on said apparatus so that said rotor is rotated by said hub said releasable clamping arrangement comprising:
a clamping shaft, rigidly coupled to said axle and being adapted to receive said rotor;
a drive disc rigidly coupled to said hub so as to rotate therewith and having an aperture therethrough for receiving said clamping shaft;
means for securing said rotor to said clamping shaft; and
a drive pin, rigidly coupled to said drive disc, for engaging and rotating said rotor about said clamping shaft.

7. An apparatus for balancing a rotor comprising:
a frame;
a data receiver, rigidly coupled to said frame;
an axle supported by said data receiver so as to be locally fixed in the vertical plane;
a driving motor having a stator rigidly coupled with said axle and with said data receiver;
a hub rotatably mounted about said fixed axle;
means for connecting said hub and motor for rotating said hub; and
a releasable clamping arrangement for clamping said rotor to be balanced on said apparatus so that said rotor is rotated by said hub said releasable clamping arrangement comprising:

a drive disc rigidly coupled to said hub so as to rotate therewith;

a clamping shaft, coupled to said drive disc so as to rotate therewith and being adapted to receive said rotor to be balanced; and means for securing said rotor to said clamping shaft so as to rotate therewith.

8. A rotor balancing apparatus comprising:

a frame;

a motor having a stator rigidly coupled with said frame and having a drive shaft;

at least one data received rigidly coupled to said frame for generating a rotor unbalance signal;

a locally fixed axle supported in the vertical plane by said data receiver and supported in the horizontal plane by at least one spring;

means for supporting said axle on said frame for rigidly coupling said fixed axle with the stator of said motor;

a hub rotatably mounted about said fixed axle;

means for coupling said hub with the drive shaft of said motor for rotating said hub about said locally fixed axle; and a releasable clamping arramgement for clamping said rotor to be balanced to said hub such that it rotates with said hub said releasable clamping arrangement comprising:

a clamping shaft, rigidly coupled to said axle and being adapted to receive said rotor;

a drive disc rigidly coupled to said hub so as to rotate therewith and having an aperture therethrough for receiving said clamping shaft;

means for securing said rotor to said clamping shaft; and a drive pin, rigidly coupled to said drive disc, for engaging and rotating said rotor about said clamping shaft.

9. A rotor balancing apparatus comprising:

a frame;

a motor having a stator rigidly coupled with said frame and having a drive shaft;

at least one data received rigidly coupled to said frame for generating a rotor unbalance signal;

a locally fixed axle supported in the vertical plane by said data receiver and supported in the horizontal plane by at least one spring;

means for supporting said axle on said frame for rigidly coupling said fixed axle with the stator of said motor;

a hub rotatably mounted about said fixed axle;

means for coupling said hub with the drive shaft of said motor for rotating said hub about said locally fixed axle; and a releasable clamping arrangement for clamping said rotor to be balanced to said hub such that it rotates with said hub said releasable clamping arrangement comprising:

a drive disc rigidly coupled to said hub so as to rotate therewith;

a clamping shaft, coupled to said drive disc so as to rotate therewith and being adapted to receive said rotor to be balanced; and means for securing said rotor to said clamping shaft so as to rotate therewith.

* * * * *